April 27, 1965     H. W. COATES ETAL     3,180,782
TEXTILE MATERIAL AND METHOD FOR MAKING SAME
Filed March 9, 1961     2 Sheets-Sheet 1
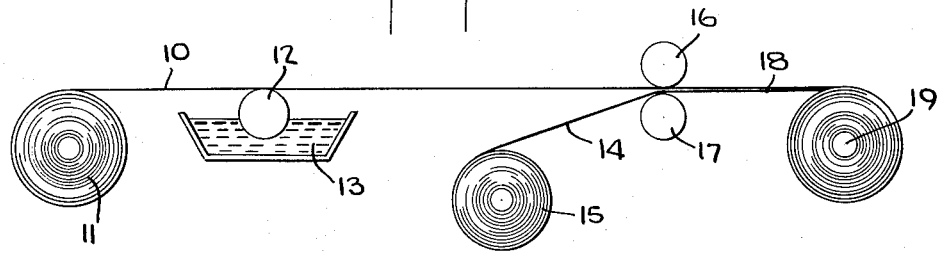
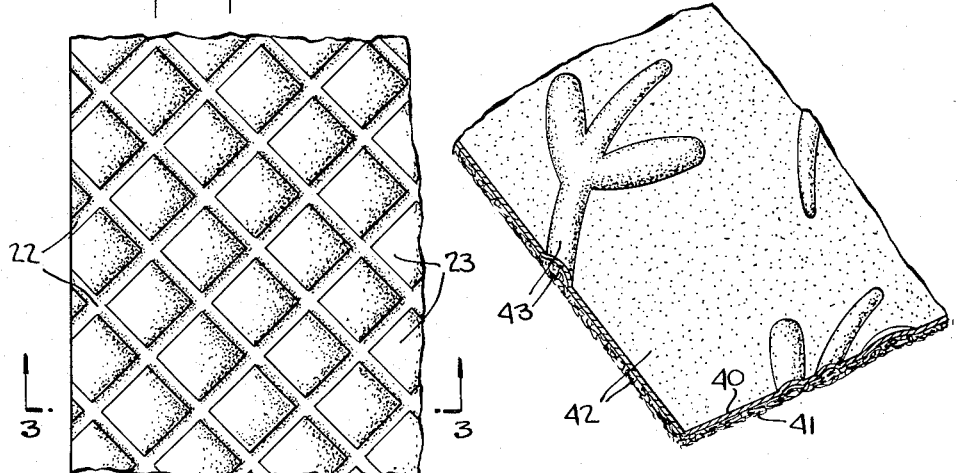
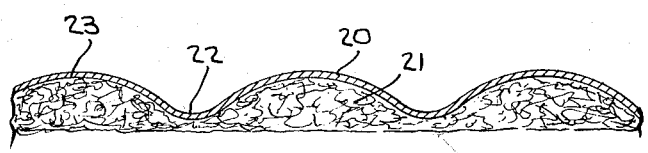

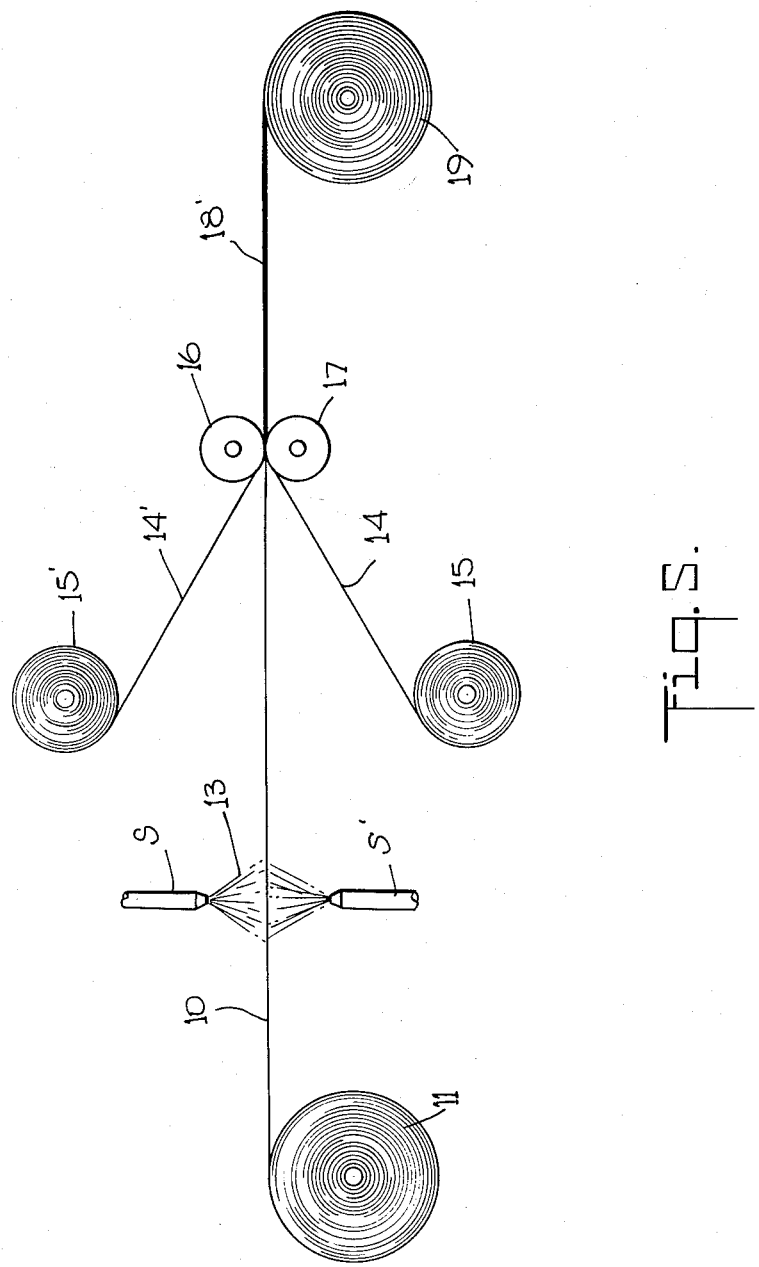

3,180,782
TEXTILE MATERIAL AND METHOD
FOR MAKING SAME
Herbert W. Coates and Roland A. Frate, Charlotte,
N.C., assignors to Celanese Corporation of America,
New York, N.Y., a corporation of Delaware
Filed Mar. 9, 1961, Ser. No. 94,629
21 Claims. (Cl. 161—73)

This invention relates to textile materials and particularly to laminated textile materials.

It is an object of this invention to provide a novel laminated textile material.

It is a further object of this invention to provide a novel laminated embossed textile material.

It is another object of this invention to provide a novel quilted textile material which eliminates the need for stitching.

It is another object of this invention to provide a quilted textile material in which the non-woven fibrous material adheres to the interlaced fabric layer.

It is yet another object of this invention to provide a novel textile material having an embroidery effect without the need for embroidery or any actual stitching.

It is a still further object of this invention to provide procedures for producing the textile materials of the foregoing objects.

Other objects and advantages of the invention will become apparent from the following detailed description and claims in which all proportions are by weight unless otherwise stated.

In accordance with one aspect of this invention, a novel laminated textile material is prepared by applying a plasticizer to a non-woven fibrous layer and then laminating an interlaced fabric to said non-woven layer. Preferably, the lamination step is effected through embossing. Dependent on the nature of the pattern embossed, many functional and decorative effects may be imparted to the laminated textile material.

The laminating and embossing may be accomplished by superimposing the plasticizer containing non-woven fibrous layer and the interlaced fabric and then applying engraved embossing plates, rollers or similar devices to the superimposed layers under pressure and preferably heat, although the latter may be dispensed with in the case of certain plasticizer-containing non-woven layers which become plasticized at ambient temperatures e.g., cellulose acetate. The temperatures and pressures will of course vary with the combination of plasticizer and non-woven fabric used. For example, when a cellulose acetate non-woven layer containing a plasticizer such as glycerol diacetae, di-methoxyethyl phthalate or glyceryl triacetate, temperatures in the range of from 150° F. to 350° F. and pressures sufficient to compact the non-woven layer down to approximately 10% of the original thickness of the non-woven layer are used. It will be understood that pressure is applied to the entire surface of the textile fabric during embossing, the pressure along the surface varying with the extent to which particular areas are to be compacted. The pressure aids in effecting bonding between the non-woven and interlaced layers and thus is preferably applied to a lesser extent even in areas where there is no compaction of textile material. During the embossing, the regions of the textile material, particularly of the non-woven layer coincident with the raised portions on the embossing devices become compacted and increase in density. The fibers of the non-woven layer at the surface between said layer and the interlaced fabric adhere to the interlaced fabric. In areas of greater compaction due to greater pressure, the plasticizer will be forced below the surface of the non-woven layer, the depth depending on the pressure. Thus the areas of greatest compaction will be the most rigid and the areas of lowest compaction, the least rigid.

Other embossing procedures may be used to accomplish the laminating and embossing. These procedures include dielectric heat sealing which is accomplished by applying an alternating current to the area to be sealed for a given time period while applying mechanical pressure; hot knife or hot bar embossing; hot pins embossing which entails embossing with hot circular pins; and sliding bar techniques.

It will be understood that if desired the lamination of the layers and the embossing may be carried out as two separate steps.

The functional and/or decorative effects in the novel textile material are due to the depressed areas of the textile material and non-depressed areas which appear to be raised wtih respect to the other areas. These effects are particularly manifested in the exposed surface of the interlaced fabric. The regions in the non-woven fibrous layer beneath the depressed areas in the interlaced fabric are compacted, of a greater density and relatively more rigid than the other regions of the fibrous web. By varying the lamination temperatures and pressures, as well as the plasticizers, interlaced fabrics and non-woven fabrics laminated textile materials of varying degrees of rigidity may be produced. The overall rigidity of the material is also dependent on the particular embossing design. Such materials find uses in clothing, surfacing material for furniture and for wall coverings.

In one particular aspect of this invention, the embossing is any of numerous quilted patterns, which include a series of crosshatched depressions or a series of depressed parallel lines. The quilted pattern may be continuous or discontinuous if greater flexibility is desired.

In another particular aspect of this invention, the non-depressed or raised area forms a pattern producing an effect of embroidery or needlework.

In a further aspect of this invention, there is provided a three layer textile material in which said plasticizer containing non-woven fibrous layer is laminated intermediate two layers of said interlaced fabric. This textile material is prepared by the same laminating and embossing process as has been described. Such a three layer structure may be embossed on either or both of its exposed surfaces.

The non-woven fibrous materials may be generally described as coherent layers of entangled and/or bonded fibers made without the fibers having been first spun into yarns and later interlaced as by weaving, knitting, braiding etc. The non-woven materials are preferably feltlike or characterized by low density, high porosity and preferably random distribution of the fibers, although a parallel distribution of fibers such as that obtained from garnetting is also satisfactory. The non-woven material fibers may be bonded together in arrangement either chemically or mechanically as by needling. The non-woven fibrous layer may be composed in whole or in part of plasticizable fibers representative examples of which include polyamides such as nylon, polyesters such as polyethylene terephthalate, acrylonitrile polymers and copolymers, olefin and olefinic ester polymers and copolymers such as polyethylene, polypropylene, poly-vinyl chloride, poly-vinyl acetate, and the like. Especially good results are achieved with organic acid esters of cellulose such as cellulose acetate, cellulose propionate, cellulose butyrate, cellulose acetate formate, cellulose acetate propionate, cellulose acetate butyrate, cellulose triacetate and the like. Of these, cellulose acetate is preferred.

Advantageously the potentially plasticizable fibers comprise more than about half of the non-woven web by weight. The component fibers may be crimped or straight and may range in denier from about 0.5 or less up to about 50 or even more. The non-woven web can be formed in conventional manner as by air blowing, air forming, carding, or the like in conventional manner. Its weight and thickness will vary with the intended end use.

For example, when used in a quilted textile material the weight will range from about 1.0 to 6.0 ounces and preferably from about 2.5 to 4.0 ounces per square yard while the thickness preferably varies from 1/8" to 3/8".

The plasticizer employed in accordance with the present invention may be of an suitable composition and may or may not be volatile. For example, if the thermoplastic fiber yarn is cellulose acetate, the preferred plasticizers include high boiling esters of polyhydric alcohols such as alkyl or aryl esters of citric acid, adipic acid, maleic acid and phthalic acid, organic esters of inorganic acids such as tributyl phosphate and tricresyl phosphate, alkoxy alkyl esters of inorganic acids or of organic polybasic acids such as dimethoxy ethyl phthalate and high boiling ethers such as butyl ether of ethylene glycol, methyl ether of ethylene glycol, etc.

The plasticizer may also comprise plasticizing materials which are also solvents for the fibrous non-woven materials. Such a plasticizing material should be used under conditions which it is incapable of effecting any appreciable dissolution of the non-woven material, i.e. it is applied in very small proportion relative to the thermoplastic material or it is employed diluted with non-solvents. Plasticizing materials in this category are preferably volatile, such as acetone methyl ethyl ketone or methylene chloride which may be used for cellulose esters.

The term "interlaced fabrics" as used in this specification is defined to include all woven, knit, and scrim fabrics as distinguished from non-woven fabrics which are not included. The interlaced fabrics are composed in whole or in part of fibers which include polyamides such as nylon, polyesters such as polyethylene terephthalate, acrylonitrile polymers and copolymers and olefin and olefin ester polymers and copolymers such as polyethylene, polypropylene, polyvinyl chloride, polyvinyl acetate and the like as well as organic acid esters of cellulose such as cellulose acetate, cellulose propionate, cellulose butyrate, cellulose acetate formate, cellulose acetate propionate, cellulose acetate butyrate, cellulose triacetate and the like. Natural fibers such as cotton, linen, ramie, sisal silk, wood and rayon may also be used. The term fibers is means to include continuous filaments as well as staple fibers.

Advantageous results have been obtained when the interlaced fabric is composed in whole or in part of fibers which are plasticizable by the plasticizer used for the fibrous non-woven material, the best results being obtained when the interlaced fabric comprises thermoplastic fibers having the same compositon as the thermoplastic fibers of the non-woven material.

The plasticizer may be applied to the non-woven layer by spraying, fogging which is in effect applying the plasticizer as a suspended mist, and coating as by passing the layer over one or more kiss rollers. Preferably the plasticizer is applied only to the surface or surfaces of the non-woven material to be laminated. This results in a laminated textile in which the plasticization is localized in the areas close to the laminated surfaces.

The non-woven material need not be laminated immediately after the application of the plasticizer, in fact, it may be pretreated with the plasticizer, rolled and stored prior to its use in the laminated fabric.

If desired, the plasticizer for the non-woven layer may be applied to and carried by the surface of the interlaced fabric to be brought into contact with the non-woven layer.

The foregoing and other objects characteristics and advantages of the present invention will be more fully understood from the following detailed description thereof when read in conjunction with the accompanying drawing, in which:

FIG. 1 is a diagrammatic illustration of a process for forming the embossed laminated textile material according to the present invention;

FIG. 2 is a plan view of a quilted textile material according to this invention;

FIG. 3 is a sectional view taken along line 3—3' of FIG. 2;

FIG. 4 shows a fragment of a textile material according to this invention having an embroidery effect; and FIG. 5 is a diagrammatic illustration of another process for forming another embossed laminated textile material according to the present invention.

In connection with FIG. 1, there will be described a continuous process for forming the textile materials. Non-woven fibrous layer 10 is unwound from roll 11 and passed over driven kiss roll 12 partially immersed in a quantity of any suitable plasticizer 13 to coat the surface of layer 10 with plasticizer. This coating may alternatively be advantageously accomplished by spraying means which spray the plasticizer on to the lower surface of layer 10. Interlaced fabric 14 is unwound from roll 15 and superimposed upon the coated surface of layer 10. Then, both superimposed layers are passed between embossing rollers 16 and 17 which are engraved in a selected pattern to laminate and emboss the layers. The laminated embossed textile material 18 is then removed and wound up on any suitable take-up roller 19 on which it may be stored and shipped to the ultimate consumer.

FIGURES 2 and 3 show a quilted textile material in a crosshatched pattern. Interlaced fabric 20 is laminated to a non-woven fibrous layer 21. The material is embossed to form a series of depressed areas 22 and raised areas 23 arranged in a crosshatched quilted pattern. The depressed areas form a series of crosshatched grooves which define thereinbetween a series of raised parallelograms arranged in rows. The highest raised areas of the material have about 10 times the thickness of the most depressed areas.

FIGURE 4 shows a laminated embossed textile material having an embroidery effect. Interlaced fabric 40 is laminated upon non-woven fibrous layer 41. The material is embossed to form depressed areas 42 and raised areas 43 which have needlework or embroidery effect. The depressed areas form a level plane and have a thickness of about 1/10 that of the highest point of the raised area.

FIG. 5 shows another embodiment of a continuous process for forming textile material. Non-woven fibrous layer 10 is unwound from roll 11 and passed between spray nozzles S and S' from which is sprayed any suitable plasticizer 13 to coat the surface of layer 10 with plasticizer. Two interlaced fabric layers, 14 and 14' are unwound from rolls 15 and 15' respectively and superimposed upon the coated surface of layer 10. Then, the three superimposed layers are passed between embossing rolls 16 and 17 which are engraved in a selected pattern to laminate and emboss the layers. The laminated embossed textile material 18' is then removed and wound up on any suitable take-up roller 19 on which it may be stored and shipped to the ultimate consumer.

The invention is further illustrated in the following examples.

Example 1

An unbonded, non-woven layer composed of 5.5 denier cellulose acetate fibers about 1 9/16 inches long, said layer weighing about 3.0 ounces per square yard and having a thickness of 3/16 inch, was sprayed with diacetin upon one surface, about 0.45 ounce of diacetin being applied per square yard. The plasticizer containing surface of the non-woven layer was then overlayed with a tricot knit fabric composed of cellulose acetate multifilament yarns of 70 denier and weighing from 2 to 4 ounces per square yard. The layers were then passed through a set of male and female embossing rolls which were engraved to produce the pattern shown in FIG. 1 at a temperature of 350° F. and a linear pressure of 1000 lbs. applied along 40 inches at the rate of 10 to 12 yards per minute. The laminated embossed material shown in FIG. 1 was produced.

*Example II*

The procedure of Example I was repeated using the same materials except that a cotton woven fabric was used. A laminated embossed textile material was produced.

*Example III*

The procedure of Example I was repeated twice using the same materials except that a knit fabric of 50% cotton and 50% cellulose acetate fibers of 5.5 denier, and 2" fiber length was used. Said fabric weighing 3 ounces per square yard was first used as the overlay fabric and then a woven fabric of 50% rayon and 50% of said cellulose acetate was used in a repetition of the procedure to produce laminated embossed textile materials.

*Example IV*

Example I was repeated using the same process and materials except that both surfaces of the non-woven cellulose acetate layer were sprayed with the plasticizer and two layers of the knit fabric were applied, one to each surface of the non-woven layer to produce, after embossing, a layered laminated embossed textile material.

It should be noted that the embossed laminated textile material of this invention need not be limited to two or three layered structures. For example, multiple layers of quilted alternate interlaced and non-woven fabric layers could be built up to provide structures to be used for example in cold weather type linings in jackets, bedding or sleeping bags.

It is to be understood that the foregoing detailed description is given merely by way of illustration and that many variations may be made therein without departing from the spirit of our invention.

Having described our invention what we desire to secure by Letters Patent is:

1. Method of preparing an embossed laminated textile material which comprises applying over the surface of a non-woven fibrous layer a plasticizer therefor, laminating said non-woven layer at said surface to an interlaced fabric, said fabric being plasticizable by said plasticizer, to form a laminated textile material, and embossing said textile material.

2. The method of claim 1, wherein the interlaced fabric comprises a blend of fibers, part of which blend is plasticizable by said plasticizer.

3. The method of claim 2, wherein plasticizer is applied over both surfaces of said non-woven fibrous layer and said non-woven layer is laminated to two layers of interlaced fabric, one on each of said surfaces of said non-woven layer.

4. The method of claim 1, wherein plasticizer is applied over both surfaces of said non-woven fibrous layer and said non-woven layer is laminated to two layers of interlaced fabric, one on each of said surfaces of said non-woven layer.

5. The method of claim 1, wherein said textile material is embossed in a quilted pattern.

6. The method of claim 1, wherein said textile material is embossed in an embroidery effect.

7. The method of claim 1, wherein said non-woven fibrous layer comprises an organic ester of cellulose.

8. The method of claim 1, wherein said non-woven fibrous layer comprises cellulose acetate.

9. The method of claim 1, wherein said non-woven fibrous layer and said interlaced fabric layer both contain fibers having the same composition.

10. A textile material comprising a non-woven fibrous layer which is plasticized at least over its surface and an interlaced fabric at said surface laminated upon said non-woven layer, said interlaced fabric being plasticizable by the plasticizer for said non-woven fibrous layer and said laminated material being embossed.

11. The textile material defined in claim 10, wherein said interlaced fabric comprises a blend of fibers, part of which blend is plasticizable by said plasticizer.

12. The textile material defined in claim 11, wherein said non-woven layer is plasticized at least over both of its surfaces and is laminated at said surfaces to two layers of interlaced fabric, one on each of said surfaces of said non-woven layer.

13. The textile material defined in claim 10, wherein said non-woven layer is plasticized at least over both of its surfaces and is laminated at said surfaces to two layers of interlaced fabric, one on each of said surfaces of said non-woven layer.

14. The textile material defined in claim 13, wherein the material is embossed in a selected pattern formed by elevations and depressions on at least one surface of the textile material.

15. The textile material defined in claim 10, wherein the material is embossed in a selected pattern formed by elevations and depressions on the surface of said non-woven fibrous layer.

16. The textile material defined in claim 10 wherein the material is embossed with elevations and depressions forming a quilted pattern.

17. The textile material defined in claim 10, wherein the plasticization in the non-woven layer and in the fabric is substantially localized in the areas in each abutting the common surface between said layer and fabric.

18. The textile material defined in claim 10, wherein said interlaced fabric contains fibers having the same composition as fibers in the non-woven layer.

19. The material defined in claim 10, wherein said selected pattern is an embroidery like effect.

20. The material defined in claim 10, wherein said non-woven fibrous layer comprises an organic ester of cellulose.

21. The material defined in claim 10, wherein said non-woven fibrous layer comprises cellulose acetate.

References Cited by the Examiner
UNITED STATES PATENTS

| | | | |
|---|---|---|---|
| 2,464,301 | 3/49 | Francis | 154—46 |
| 2,537,126 | 1/51 | Francis | 154—106 |
| 2,538,899 | 1/51 | Dodge et al. | 156—253 |
| 2,946,713 | 7/60 | Dusina et al. | 154—106 |
| 3,043,733 | 7/62 | Harmon et al. | 156—209 |

EARL M. BERGERT, *Primary Examiner.*

CARL F. KRAFFT, *Examiner.*